United States Patent [19]

Otsubo et al.

[11] Patent Number: 5,239,896

[45] Date of Patent: Aug. 31, 1993

[54] HYDRAULIC SERVOMECHANISM CONTROL SYSTEM IN AUTOMATIC TRANSMISSION

[75] Inventors: Hideaki Otsubo; Kunihiro Iwatsuki; Hiromichi Kimura, all of Toyota; Yukihiro Kobayashi, Obu; Kazunori Ishikawa, Toyota, all of Japan

[73] Assignees: Aisin AW Co., Ltd., Anjo; Toyota Jidosha Kabushiki Kaisha, Toyota, both of Japan

[21] Appl. No.: 577

[22] Filed: Jan. 4, 1993

Related U.S. Application Data

[63] Continuation of Ser. No. 904,908, Jun. 25, 1992, abandoned, which is a continuation of Ser. No. 606,861, Oct. 31, 1990, abandoned.

[30] Foreign Application Priority Data

Nov. 6, 1989 [JP] Japan .................................. 1-288182

[51] Int. Cl.$^5$ .............................................. B60K 41/06
[52] U.S. Cl. ........................................ 74/868; 74/866; 74/867
[58] Field of Search ............................ 74/866, 867, 868

[56] References Cited

U.S. PATENT DOCUMENTS

| | | | |
|---|---|---|---|
| 4,148,232 | 4/1979 | Moriya | 74/867 X |
| 4,690,017 | 9/1987 | Taniguchi et al. | 74/866 |
| 4,700,591 | 10/1987 | Yasue et al. | 74/868 |
| 4,722,247 | 2/1988 | Shindo et al. | 74/866 |
| 4,727,772 | 3/1988 | Sumiya et al. | 74/867 |
| 4,789,937 | 12/1988 | Yasue et al. | 364/424.1 |
| 4,924,731 | 5/1990 | Hayakawa et al. | 74/867 X |
| 4,955,256 | 9/1990 | Kashihara et al. | 74/867 X |

Primary Examiner—Richard M. Lorence
Assistant Examiner—Benjamin Levi
Attorney, Agent, or Firm—Oblon, Spivak, McClelland, Maier & Neustadt

[57] ABSTRACT

Herein disclosed is a hydraulic servomechanism control system in an automatic transmission, for modulating the oil pressure of any hydraulic servomechanism to engage or release frictional engagement devices. The control system comprises: two pressure modulating mechanisms for modulating the oil pressure of said hydraulic servomechanisms; and a shutoff mechanism for shutting off, when one of said pressure modulating mechanisms is caused to communicate with said hydraulic servomechanism, the communication between the other pressure modulating mechanism and said hydraulic servomechanism.

3 Claims, 5 Drawing Sheets

| P.N | C1 | C2 | C0 | B0 | B1 | B2 | B3 | 2ND TRANSMISSION ASSEMBLY | 1ST TRANSMISSION ASSEMBLY |
|---|---|---|---|---|---|---|---|---|---|
| R |  | ○ | ○ |  |  |  | ○ | LOW | RW |
| 1 | ○ |  | ○ |  |  |  | × | LOW | 1ST SPEED |
| 2 | ○ |  |  | ○ |  |  | × | HIGH | 1ST SPEED |
| 3 | ○ |  | ○ |  | × | ○ |  | LOW | 2ND SPEED |
| 4 | ○ |  |  | ○ | × | ○ |  | HIGH | 2ND SPEED |
| 5 | ○ | ○ | ○ |  |  | ○ |  | LOW | 3RD SPEED |
| 6 | ○ | ○ |  | ○ |  | ○ |  | HIGH | 3RD SPEED |

HYDRAULIC SERVOMECHANISM CONTROL SYSTEM IN AUTOMATIC TRANSMISSION

This application is a continuation of application Ser. No. 07/904,908, filed on Jun. 25, 1992, now abandoned, which is a continuation of 07/606,861 filed now abandoned. Oct. 31, 1990.

BACKGROUND OF THE INVENTION

The present invention relates to a control system in a vehicular automatic transmission for modulating the oil pressure of a hydraulic servomechism to engage or release frictional engagement means such as clutches.

Generally speaking, an automatic transmission is equipped with a gear transmission mechanism, a plurality of frictional engagement means and hydraulic control means. The automatic transmission is constructed to set a plurality of gear changes by engaging predetermined one of the frictional engagement means by the oil pressure supplied from the hydraulic control means.

The engagement and release of those frictional engagement means are accomplished to supply and drain the oil pressure to and from a hydraulic servomechanism which is composed main of a cylinder, a piston and a return spring. The engagement of the frictional engagement means is generally effected to reduce a large speed difference between two frictional members into a state of "0" relative speed. In order to smoothed this reduction, there is provided an accumulator. Specifically, a rise in the oil pressure at the hydraulic servomechanism is suppressed, while the oil is being accumulated in the accumulator, the suppression being according to the characteristics of the accumulator.

On the contrary, the release of the frictional engagement means is accomplished to disengage the two frictional members in the state of "0" relative speed by draining the hydraulic servomechanism of its oil. In this case, the draining rate of the oil is not a considerable problem. In the prior art, therefore, no pressure modulating mechanism is elaborately provided for the oil pressure to be drained from the hydraulic servomechanism.

As, however, there has been developed in recent years an automatic transmission which is capable of establishing multiple speed changes of five or six speeds, there appears an automatic transmission which is required to control not only the engaging rate but also the releasing rate of one frictional engagement means.

In this automatic transmission, two pressure modulating mechanisms, i.e., an accumulator for modulating the oil pressure to be supplied and a pressure modulating valve for modulating the drain oil pressure are provided for one hydraulic servomechanism.

Despite of this structure, however, the mere connection of the two pressure modulating mechanisms to one hydraulic servomechanism would exert influences on the oil pressure modulated by one modulating mechanism upon the other pressure modulating mechanism through the hydraulic servomechanism. As a result, the two pressure modulating mechanisms would then interfere each other to raise a trouble that the pressure modulating characteristics, as expected, could not be achieved.

SUMMARY OF THE INVENTION

A major object of the present invention is to provide a control system capable of reducing the shifting shocks of an automatic transmission by accurately controlling the timings for engaging and releasing the frictional engagement means of the automatic transmission.

Another object of the present invention is to provide a control system capable of preventing the mutual interference of two pressure modulating mechanisms of an automatic transmission in which two pressure modulating mechanisms are connected to one hydraulic servomechanism.

Still another object of the present invention is to provide a control system for modulating the oil pressure to be supplied to the hydraulic servomechanism by means of an accumulator and the drain pressure coming from the hydraulic servomechanism by means of a pressure modulating value which employs as its signal pressure the oil pressure outputted from a linear solenoid valve.

These objects are achieved by a hydraulic servomechism control system in an automatic transmission, for modulating the oil pressure of any hydraulic servomechanism to engage or release frictional engagement means, which system comprises: two pressure modulating mechanisms for modulating the oil pressure of said hydraulic servomechanism; and a shutoff mechanism for shutting off, when one of said pressure modulating mechanisms is caused to communicate with said hydraulic servomechanism, the communication between the other pressure modulating mechanism and said hydraulic servomechism.

The objects of the present invention can also be achieved by a hydraulic servomechanism control system in an automatic transmission, wherein said shutoff mechanism is a first relay valve which is disposed midway of an oil passage for connecting said hydraulic servomechanism and an accumulator and which opens said oil passage, when the oil pressure is to be supplied to said hydraulic servomechanism, and closes said oil passage when the oil pressure is to be discharged from said hydraulic servomechanism.

The objects of the present invention can also be achieved by a hydraulic servomechanism control system in an automatic transmission, wherein said pressure modulating valve is a valve having its pressure modulating level varied in accordance with a control pressure inputted.

The objects of the present invention can also be achieved by a hydraulic servomechanism control system in an automatic transmission, which system further comprises a linear solenoid valve for establishing said control oil pressure.

The above and further objects and novel features of the present invention will more fully appear from the following detailed description when the same is read with reference to the accompanying drawings. It is, however, to be expressly understood that the drawings are for purposes of illustration only and is not intended as a definition of the limits of the invention.

DETAILED DESCRIPTION OF THE DRAWINGS

DETAILED DESCRIPTION OF THE PREFERRED EMBODIMENT

Figure 1:
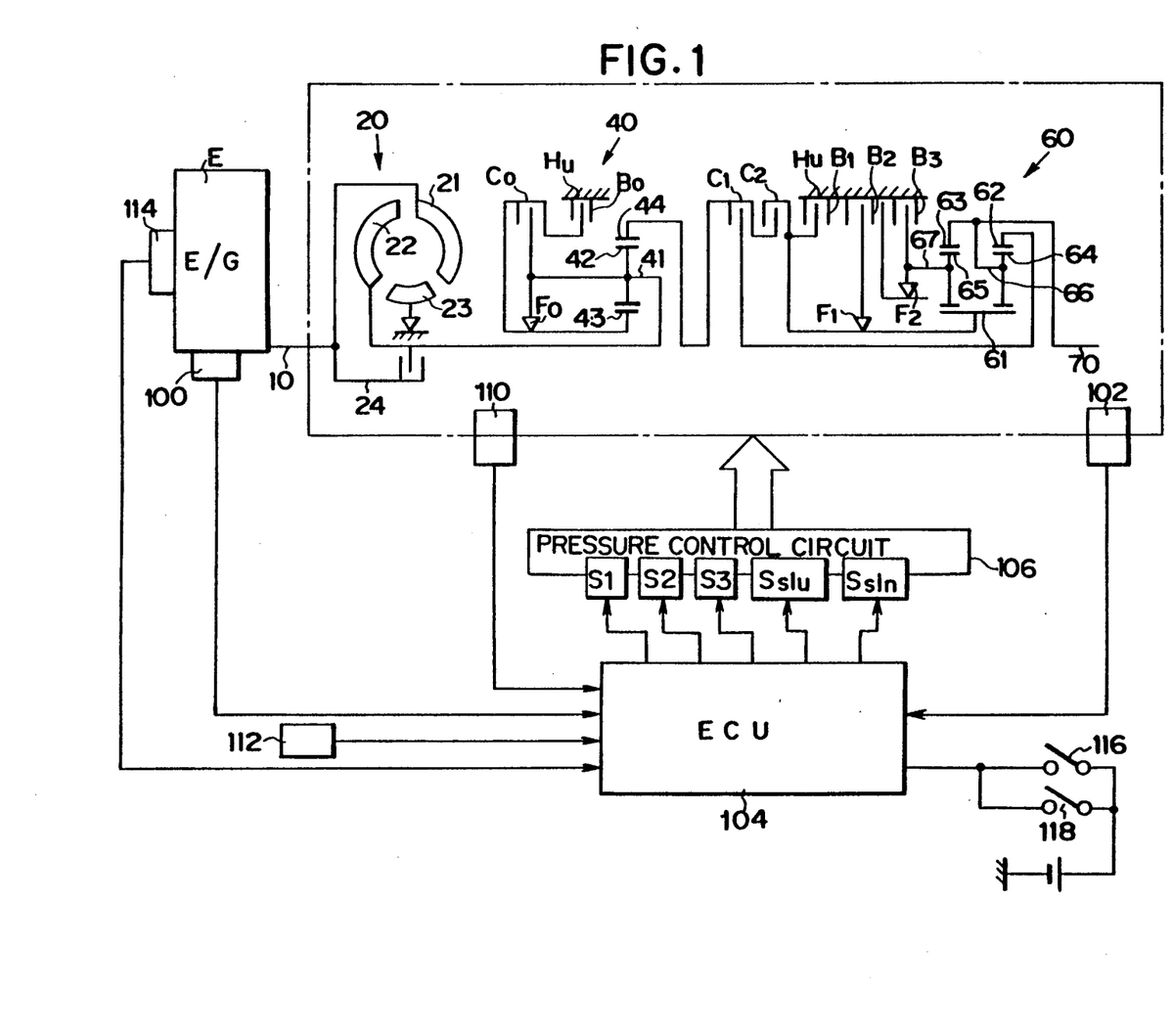
FIG. 1 is a skeleton diagram showing an automatic transmission which forms the subject of the present invention.

FIG. 1 is a skeleton diagram schematically showing an automatic which forms the subject of the present invention. The automatic transmission, as shown, is equipped as its shift mechanism with a torque converter 20, a second transmission assembly 40 and a first transmission assembly 60 for effecting three-forward and one reverse gear changes.

The torque converter 20 is equipped with a pump impeller 21, a turbine runner 22, a stator 23 and a lockup clutch 24. The pump impeller 21 is connected to the crankshaft 10 of an engine E, and the turbine runner 22 is connected to the carrier 41 of a planetary gear set in the second transmission assembly 40.

In this second transmission assembly 40, a pinion gear 42 held rotatably by the carrier 41 is meshing with a sun gear 43 and a ring gear 44. Moreover, a clutch C0 and a one-way clutch F0 are interposed between the sun gear 43 and the carrier 41, and a brake B0 is interposed between the sun gear 43 and a housing Hu.

The first transmission assembly 60 is equipped with two front and rear planetary gear sets. These planetary gear sets share a sun gear 61 and are equipped, respectively, with pinion gears 64 and 65 for meshing with the common sun gear 61, carries 66 and 67 for holding the pinion gears 64 and 65, and ring gears 62 and 63 for meshing with the pinion gears 64 and 65.

The ring gear 44 of the second transmission assembly 40 is connected through a clutch C1 to the aforementioned ring gear 62. Another clutch C2 is interposed between the ring gear 44 and the sun gear 61. Moreover, the aforementioned carrier 66 and ring gear 63 are connected to each other and together to an output shaft 70. Between the aforementioned carrier 67 and housing Hu, on the other hand, there are interposed a brake B3 and a one-way clutch F2. Moreover, a brake B2 is interposed through another one-way clutch F1 between the sun gear 61 and the housing Hu, and a brake B1 is interposed between the sun gear 61 and the housing Hu.

Figure 2:
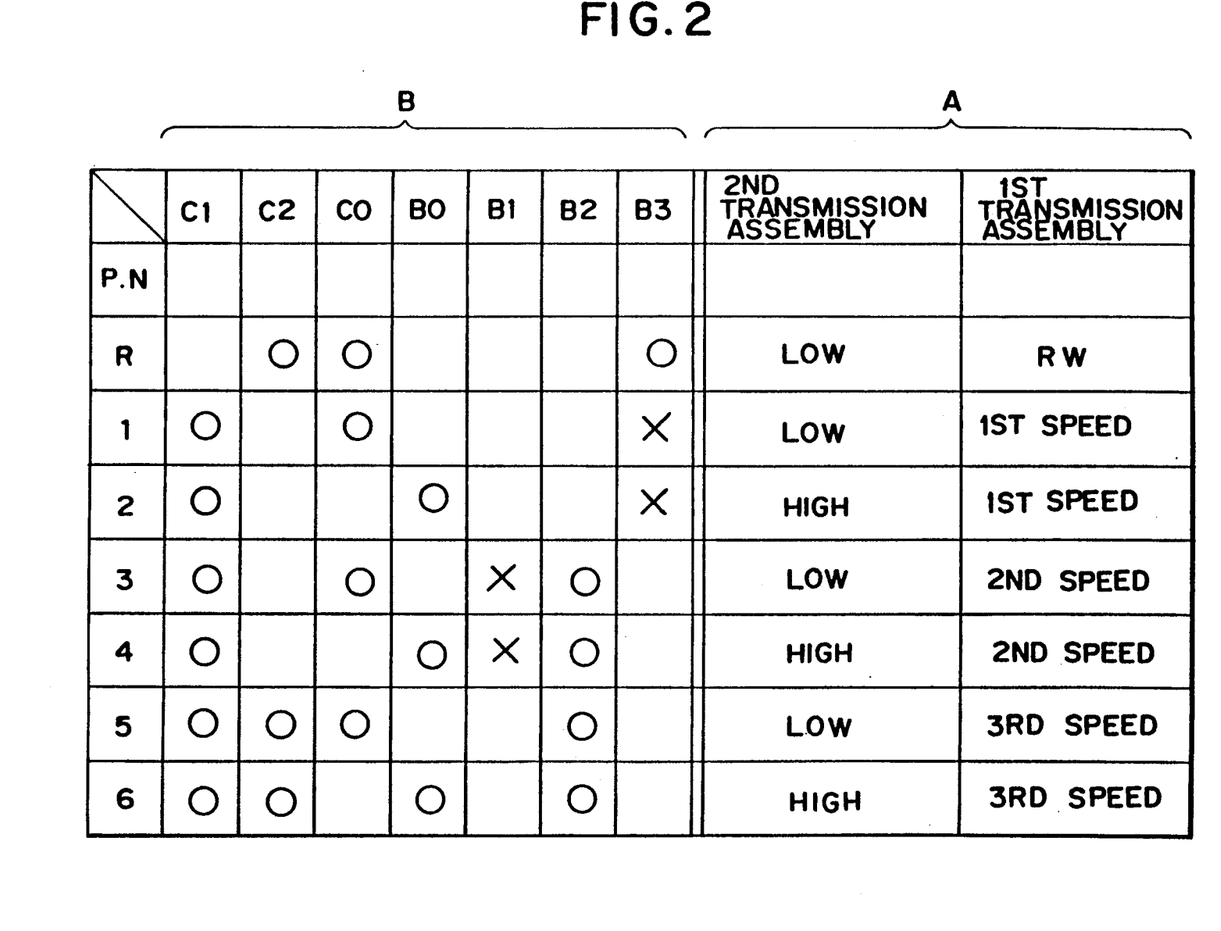
FIG. 2 is a chart showing the engagement/release of fractional engagement means for setting individual gear ratios in the automatic transmission.

The automatic transmission is equipped with the shift mechanism thus far described and has its individual clutches and brakes engaged and/or released, as presented at the column B in FIG. 2, to perform the shift control. This shift control is effected by controlling solenoid valves S1 to S3 and Ssln and a linear solenoid valve Sslu in an oil pressure control circuit 106 in accordance with a present shift pattern, by means of an electronic control unit (ECU) 104 which is made receptive of the signals of a throttle opening sensor 100 for detecting a throttle opening $\theta$ representation of a load state of the engine E and a vehicular velocity sensor 102 for detecting the running velocity of the vehicle. In the clutch and brake application chart of FIG. 2: symbols ◯ indicate the engaged state; symbols X indicate the engaged state to be taken only at the time of engine braking; and blanks indicate the released state.

Considering the balance between the difficulty in the control of simultaneous shifts and the benefit of multiple gear changes, the present invention is exemplified by an automatic transmission capable of effecting five-forward gear changes of 1st, 2nd, 3rd, 5th and 6th speeds while abolishing the 4th speed appearing in the clutch and brake application chart of FIG. 2.

Figure 3A:
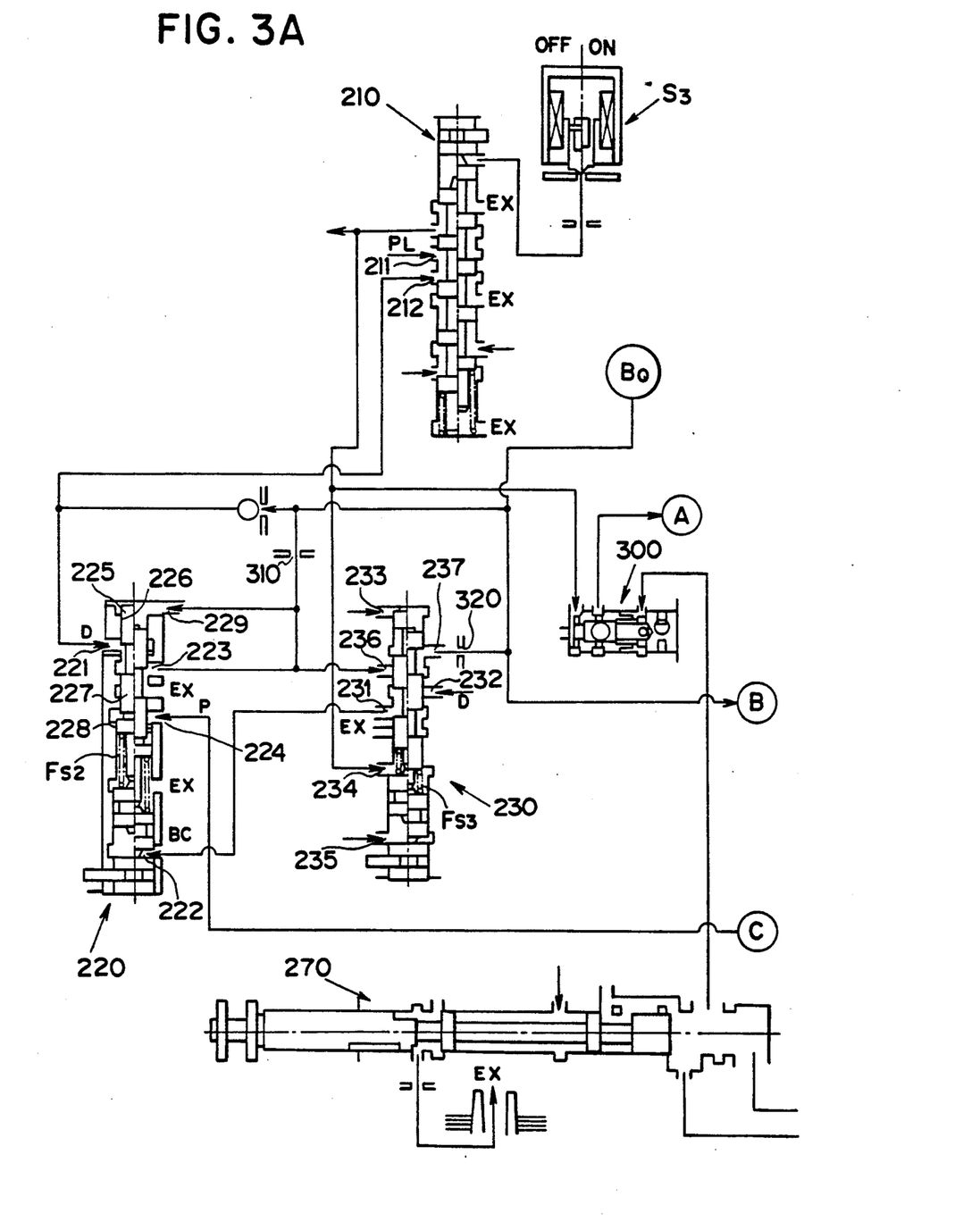
FIGS. 3A and 3B are oil pressure circuit diagrams.
Figure 3B:
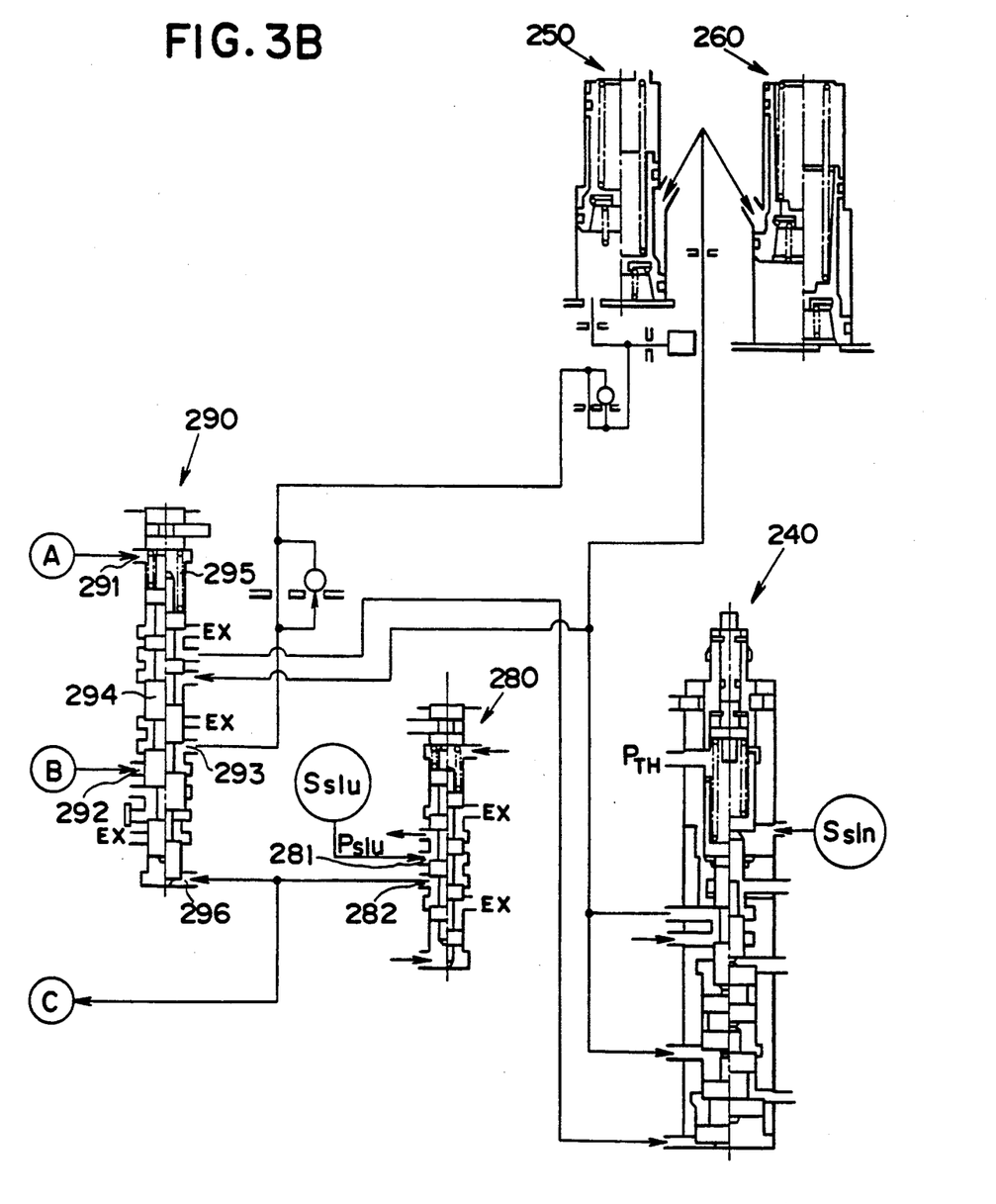

The aforementioned solenoid valves S1 and S2 control the first and second shift valves of the first transmission assembly 60, and the solenoid valve S3 controls a third shift valve for shifting the second transmission assembly 40 from high to low gears, as shown in FIGS. 3A and 3B. On the other hand, the solenoid valve Ssln controls the back pressures of the individual accumulators including the accumulator of the brake B0. Moreover, the linear solenoid valve Sslu controls the oil pressure of the brake B0.

In FIG. 1, reference numeral 110 designates a shift position sensor for detecting such one of positions including the neutral range (N), the drive range (D) or the reverse range (R), as is selected by the driver. Numeral 112 designates a pattern select switch for selecting one of shift patterns including the economy mode (E) and the power mode (P). Moreover, numeral 114 designates a water temperature sensor for detecting the temperature of the cooling water of the engine E. Numeral 116 designates a brake switch for detecting the depression of the foot brake. Numeral 118 designates a brake switch for detecting the pull of the side brake.

For the gear change from 2nd to 3rd speeds, the automatic transmission thus constructed is controlled, as is apparent from FIG. 2, to engage the brake B2 of the first transmission assembly 60 and to release the brake B0 of the second transmission 40. If, in this case, no control is elaborately performed like the prior art for releasing the brake B0, this release of the brake B0 is stated earlier than the engagement of the brake B2 of the first transmission assembly 60 so that the down shift of the second transmission assembly 40 goes ahead irrespective of the upshift from 2nd to 3rd speeds. This gives the automatic transmission the overall characteristics, in which a small downshift is accompanied by a large upshift. In this automatic transmission, therefore, the brake B0 has its oil pressure modulated at its release time so that it may be release while maintaining the balance with the brake B2. This control is exemplified by feeding back the oil pressure on the basis of a control signal coming from the electronic control unit 104 while monitoring the actual shifted state such as the revolving states of the rotary members.

As a result, the following two pressure modulating mechanisms are connected with the hydraulic servo-mechanism for engaging and releasing the brake B0: an accumulator acting as the pressure modulating means for functioning when in the ordinary engagement control; and a control valve acting as the pressure modulating means for functioning when in the release. In order to avoid the interference between these two pressure modulating mechanisms, there is adopted the following oil passage structure.

FIGS. 3A and 3B show an essential portion of the aforementioned hydraulic system.

In FIGS. 3A and 3B: reference numeral 210 designates a shift valve for switching supply and discharge of the oil pressure to and from the brake B0; numeral 220 designates a B0 control valve for modulating the oil pressure at the time of releasing the brake B0; numeral 230 designates a first relay valve; numeral 240 designates an accumulator control valve for controlling the back pressures of the plural accumulators; numeral 250 designates a B0 accumulator for controlling the oil pressure at the time of engaging the brake B0; numeral 250 designates a B2 accumulator for controlling the oil pressure at the time of engaging the brake B2; numeral 270 designates a manual valve to be operated in association with the shift lever disposed sideways of the driver's seat; numeral 280 designates a solenoid relay valve; numeral 290 designates a second relay valve; and numeral 300 designates a check valve.

The engagement and release of the brake B0 are controlled in the following manners.

First of all, the engagement of the brake B0 will be described in the following.

The shift for engaging the brake B0 is divided into two cases, in which only the second transmission assembly 40 shifts by itself while the first transmission assembly 60 being left as it is and in which the first transmission assembly 60 shifts down whereas the second transmission assembly 40 shifts up to a high gear. The former case is exemplified by the shift from the 1st to 2nd speeds or from the 5th to 6th speeds, and the latter case is exemplified by the downshift from the 3rd to 2nd speeds.

In the shift for achieving the shift of the automatic transmission in its entirety by shifting the second transmission assembly 40 simultaneously with the first transmission assembly 60, the time lag till the engagement of the brake B0 is desirably suppressed to be as short as possible for the sequence control of the shift. In the shift for the second transmission assembly 40 only, on the other hand, such desire is not demanded, but a rather relatively slow engagement is preferable for the shifting characteristics.

For engaging the brake B0, therefore, this embodiment switches the oil passage between the cases in which only the second transmission assembly 40 shifts by itself and in which the second transmission assembly 40 is shifted together with the first transmission assembly 60.

These operations will be specifically described in the following. When the brake B0 is to be engaged, the solenoid valve S3 is turned off to apply the oil pressure to one end of the shift valve 210 so that the shift valve 210 is brought into the lefthand state of FIG. 3A to output a line pressure PL at a port 212 from a port 211.

The B0 control valve 220 is of the spool type, in which a spool 225 is formed with: a land 226 for opening or closing a port 221 to be fed with the line pressure PL; a land 227 for opening or closing a drain port EX which is formed adjacent to a port 223 for outputting a modulated oil pressure; and a land 228 having a larger diameter than the land 227. At the axially opposed end to a spring Fs2 for urging the spool 225 axially, there is formed a port 229 which communicates with the port 223. Moreover, a control pressure port 224 is opened between the larger-diameter land 228 and the adjacent land 227. As a result, the line pressure PL is modulated to a level according to the elastic force of the spring Fs2 so that the modulated pressure is outputted from the port 223, in case the control pressure is not applied to the control pressure port 224. In case the control pressure is applied to the control pressure port 224, on the other hand, the pressure modulating level is reduced according to the control pressure. Here, the control pressure for the control pressure port 224 is generated by the linear solenoid valve Sslu and is fed through the solenoid relay valve 280.

Moreover, the spool 225 is forced into the state, as shown at the lefthand side of FIG. 3A, to block the pressure modulating action by applying the oil pressure to a port 222, which is located at the lower side of FIG. 3A, by the action of the spring Fs2. Incidentally, this state is achieved by feeding from the first relay valve 230 to the port 222 the D-range pressure which is generated when the shift lever (although not shown) is in the drive range.

The aforementioned first relay valve 230 is provided for augmenting the oil supply passage to the brake B0 when the automatic transmission is shifted down from the 3rd to 2nd speeds. This first relay valve 230 effects the connection and disconnection between ports 236 and 237 and the connection and disconnection between ports 231 and 232 according to the balance among the oil pressure of the brake B2 acting upon a port 233, the oil pressure of the the clutch C0 acting upon a port 234, the oil pressure of the clutch C2 acting upon a port 235, and the elastic force of a spring Fs3.

If the shift from the 3rd to 2nd speeds is decided, more specifically, a higher gear shift command signal of the second transmission assembly 40 is outputted at first to turn off the solenoid valve S1 and the solenoid valve S3 and on the solenoid valve S2. Simultaneously with this, the output pressure Pslu of the linear solenoid valve Sslu is minimized.

In this state, not the oil pressure of the clutches C2 and C0 but only the oil pressure of the brake B2 is established and applied to the port 233 of the first relay valve 230. Then, this first relay valve 230 takes its righthand position, as shown, to provide the communication between the port 236 and the port 237. This provides the oil passages of a smaller orifice 310 and a larger orifice 320 for the oil passages for the brake B0 so that the oil passage resistances are reduced to effect a rapid engagement of the brake B0. Since, moreover, the output pressure Pslu of the linear solenoid valve Sslu is minimized, the output pressure of the B0 control valve 220 can be maximized to shorten the time lag till the oil supply to and the engagement of the brake B0. This occurs not only because the oil passage resistance is dropped but also because the supply oil pressure itself is raised.

After a predetermined time period has elapsed from the shift decision from the 3rd to 2nd speeds, a downshift command signal of the first transmission assembly 60 is outputted to turn on the solenoid valve S1 and the solenoid valve S2 and off the solenoid valve S3. Then, the B2 oil pressure of the port 233 of the first relay valve 230 is drained so that the first relay valve 230 takes the lefthand position of FIG. 3A. As a result, the communication between the port 236 and the port 237 is shut off, but the communication between the port 231 and the port 232 is established. Then, the oil passage through the larger orifice 320 of the oil passages to the brake B0 is closed so that the oil is supplied by way of only the oil passage through the smaller orifice 310. As a result, the shift of only the second transmission assembly 40 by the engagement of the brake B0 is slowly effected to reduce the shifting shocks.

In other words, in case of the shift from the 3rd to 2nd speeds, the oil is supplied not only via the oil passage through the smaller orifice 310 but also via the oil passage through the larger orifice 320 for the predetermined time period from the decision of the shift to the output of the shifting command of the first transmission assembly 60, so that the oil passage resistance is reduced. After lapse of this predetermined time period, the oil is supplied to the brake B0 only via the oil passage through the smaller orifice 310 so that the oil passage resistance is increased to reduce the shocks at the time of the high gear shift of the second transmission assembly 40.

Incidentally, for a shift other than that from the 3rd to 2nd speed, e.g., the shift from the 1st to 2nd speeds or the shift from the 5th to 6th speeds for bringing the brake B0 from released to engaged states, the individual ports of the first relay valve 230 takes the lefthand positions, as shown, so that the oil supply passage to the brake B0 is restricted to that through the smaller orifice 310 only.

Here, the automatic transmission shown in FIG. 1 has its B0 accumulator 250 functioning no matter whether the oil might be supplied to the brake B0 only by way of the oil passage through the smaller orifice 310 or additionally by way of the oil passage through the larger orifice 320.

Specifically, the second relay valve 290 is of spool type, which is formed with: a port 291 communicating with the check valve 300 at its portion housing a spring 295 for urging a spool 294 axially; and a port 296 for applying a control oil pressure generated by the linear solenoid valve Sslu, at its end portion opposed to the end having the former port 291. The second relay valve 290 is further formed at its axially middle portion with: a port 292 communicating with the hydraulic servomechanism of the brake B0; and a port communicating with the B0 accumulator 250. The communication between the ports 292 and 293 is established or shut off.

The second relay valve 290 thus constructed has its port 291 fed with the output pressure of the check valve 300 and takes the righthand position of FIG. 3A at all times except for the shift from the 2nd to third speeds. The check valve 300 outputs the oil pressure to the second relay valve 290 when the oil pressure of the clutch C0, the L-range oil pressure and the "2nd" range oil pressure are individually generated.

This automatic transmission uses the gear ratios other than the 4th speed shown in FIG. 2, the second relay valve 290 takes the righthand position, as shown, at the gear changes other than that from the 2nd to 3rd speeds. As a result, in these other gear changes, the oil supplied to the hydraulic servomechanism of the brake B0 is also fed to the port 250 to cause the accumulator 250 to perform its function.

Thus, in this embodiment, when the brake B0 has its hydraulic servomechanism supplied with the oil, i.e., is to be engaged, its transitional characteristics are basically controlled by the B0 accumulator 250. Moreover, this B0 accumulator 250 has its pressure modulating characteristics controlled in the well-known manner by the solenoid valve Ssln and the accumulator control valve 240.

On the other hand, as has been described hereinbefore, the B0 control valve 220 never fails to be fixed in the shown lefthand position by the first relay valve 230, when the brake B0 is to be engaged, to execute no pressure modulation. As a result, the oil pressure at the engagement of the brake B0 is controlled exclusively by the pressure modulating function of the B0 accumulator.

Next, the control of the oil pressure when the brake B0 has its hydraulic servomechanism drained of its oil, namely, is to be released will be described in the following.

Since, in this automatic transmission, the gear ratio corresponding to the 4th speed of FIG. 2 is cut off, the shifts for releasing the brake B0 are restricted to the gear changes from the 2nd to 1st speeds, from the 6th to 5th speeds, and from the 2nd to 3rd speeds. Of these, the shifts from the 2nd to 1st and from the 6th to 5th are kept away from any change in the first transmission assembly 60 so that no problem will arise even if the release of the brake B0 is not accurately timed. On the contrary, the shift from the 2nd to 3rd speeds is required to have a strictly dimed pressure modulation control because the first transmission assembly 60 is shifted up from the 1st to 2nd speeds concurrently with the release of the brake B0. For this shift from the 2nd to 3rd speeds, therefore, the second relay valve 290 is brought into the lefthand position, as shown, to have its port 291 kept away from the oil pressure outputted from the check valve 300, so that the second relay valve 290 has its ports 292 and 293 shut off.

As a result, the oil passage between the B0 accumulator 250 and the brake B0 is shut off, and the oil passage between the B2 accumulator and the brake B0 is accordingly shut off so that the B2 accumulator 260 attached to the brake B2 for effecting the gear changes of the first transmission assembly 60 can be freely controlled by the solenoid valve Ssln and the accumulator control valve 240 while exerting none of its influences upon the brake B0.

On the other hand, the first relay valve 230 is brought into the shown righthand position so that the D-range pressure at the port 222 of the B0 control valve 220 is drained to enable the B0 control valve 220 to modulate its pressure. As a result, the brake B0 has its releasing oil pressure controlled finely through the B0 control valve 220 by the control pressure Pslu which is generated by the linear solenoid valve Sslu.

Figure 4:
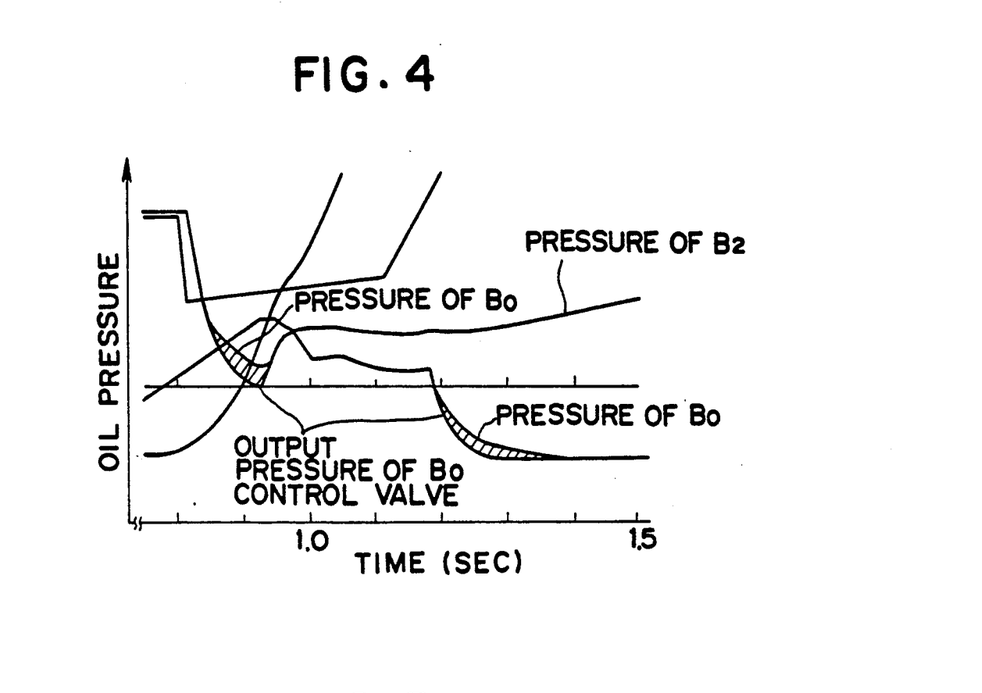
FIG. 4 is a diagram plotting the shifting transitional characteristics in which the oil passage between two pressure modulating mechanisms is connected.
Figure 5:
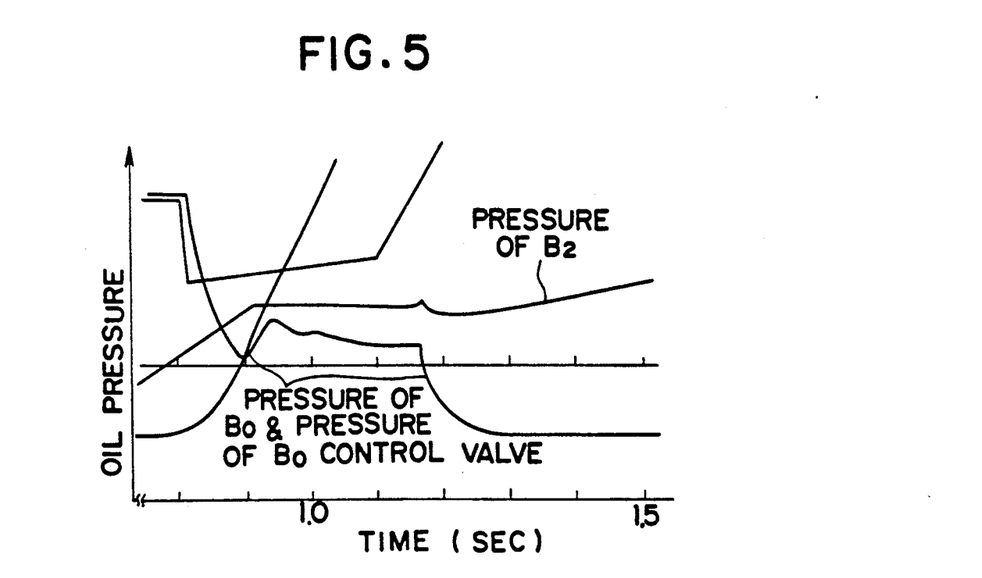
FIG. 5 is a diagram plotting the shifting transitional characteristics in which the oil passage between the two pressure modulating mechanisms is shut off.

FIG. 4 plots the shifting characteristics in case the hydraulic servomechanism of the brake B0 is left connected to the B0 accumulator 250, and FIG. 5 plots the shifting characteristics in the disconnected case.

In case of connection to the accumulator, as seen from FIG. 4, a considerable difference is created between the output pressure of the B0 control valve 220 and the actual oil pressure of the brake B0. This difference is found, as hatched in FIG. 4, and implies that the oil pressure of the brake B0 is deviated from the target pressure and accordingly that the shift controlling accuracy is all the more deteriorated.

In case of a shift with the brake B0 and the accumulator 250 being shut off, on the contrary, little difference arises between the output pressure of the B0 control valve 222 and the actual oil pressure of the brake B0. This implies that the oil pressure of the brake B0 can be controlled to hit the target, and supports that an arbitrary pressure-modulated state can be accurately realized by properly controlling the control oil pressure Pslu which is established by the linear solenoid valve Sslu.

According to the present embodiment, the communication of the B0 accumulator 250 with the brake B0 can be shut off by the second relay valve 290, and the B0 control valve 220 can be brought out of its pressure modulation by the first relay valve 230. Thus, the two valve modulating mechanisms of the brake B0, which might otherwise interfere with each other, are disconnected so that their interferences can be prevented to provide excellent shifting characteristics.

What is claimed is:

1. A hydraulic servomechanism control system in an automatic transmission, for modulating the oil pressure of any hydraulic servomechanism to engage or release frictional engagement means, comprising:

an accumulator and a pressure modulating valve comprising two pressure modulating mechanisms for modulating the oil pressure of said hydraulic servomechanism; and a shutoff mechanism for shutting off, when one of said pressure modulating mechanisms is caused to communicate with said hydraulic servomechanism, the communication between the other pressure modulating mechanism and said hydraulic servomechanism, wherein said shutoff mechanism is a first relay valve which is disposed midway of an oil passage for connecting said hydraulic servomechanism and said accumulator and which opens said oil passage, when the oil pressure is to be supplied to said hydraulic servomechanism, and closes said oil passage when the oil pressure is to be discharge from said hydraulic servomechanism.

2. A hydraulic servomechanism control system in an automatic transmission, for modulating the oil pressure of any hydraulic servomechanism to engage or release frictional engagement means, comprising:

an accumulator and a pressure modulating valve comprising two pressure modulating mechanisms for modulating the oil pressure of said hydraulic servomechanism; and a shutoff mechanism for shutting off, when one of said pressure modulating mechanisms is caused to communicate with said hydraulic servomechanism, the communication between the other pressure modulating mechanism and said hydraulic servomechanism, wherein said pressure modulating valve is a valve having its pressure modulating level varied in accordance with a control pressure inputted, further comprising a linear solenoid valve for establishing said control pressure, further comprising a relay valve for providing the communication between said linear solenoid valve and said pressure modulating valve when said hydraulic servomechanism is to be drained.

3. A hydraulic servomechanism control system in an automatic transmission, for modulating the oil pressure of any hydraulic servomechanism to engage or release frictional engagement means, comprising:

an accumulator and a pressure modulating valve comprising two pressure modulating mechanisms for modulating the oil pressure of said hydraulic servomechanism;

a shutoff mechanism for shutting off, when one of said pressure modulating mechanisms is caused to communicate with said hydraulic servomechanism, the communication between the other pressure modulating mechanism and said hydraulic servomechanism;

a first orifice interposed between said hydraulic servomechanism and said pressure modulating valve;

a second orifice disposed in parallel with said first orifice and having a larger opening are than that of said first orifice; and a relay valve for selectively closing an oil passage leading from said pressure modulating valve through said second orifice to said hydraulic servomechanism and for feeding an oil pressure to block the pressure modulating action to said pressure modulating valve when said oil passage is closed.

* * * * *